(12) United States Patent
Taylor

(10) Patent No.: US 11,424,929 B2
(45) Date of Patent: Aug. 23, 2022

(54) AUTHENTICATION USING ENCRYPTED BIOMETRIC INFORMATION

(71) Applicant: Bank of America Corporation, Charlotte, NC (US)

(72) Inventor: Jo-Ann Taylor, Godalming (GB)

(73) Assignee: Bank of America Corporation, Charlotte, NC (US)

( * ) Notice: Subject to any disclaimer, the term of this patent is extended or adjusted under 35 U.S.C. 154(b) by 109 days.

(21) Appl. No.: 17/143,896

(22) Filed: Jan. 7, 2021

(65) Prior Publication Data
US 2022/0216996 A1   Jul. 7, 2022

(51) Int. Cl.
*H04L 9/32* (2006.01)
*G06V 40/13* (2022.01)
*H04L 9/06* (2006.01)
*G06V 40/12* (2022.01)
*G06V 40/19* (2022.01)
*G06V 40/18* (2022.01)

(52) U.S. Cl.
CPC ............ *H04L 9/3231* (2013.01); *G06V 40/13* (2022.01); *G06V 40/1365* (2022.01); *H04L 9/0643* (2013.01); *G06V 40/19* (2022.01); *G06V 40/197* (2022.01)

(58) Field of Classification Search
None
See application file for complete search history.

(56) References Cited

U.S. PATENT DOCUMENTS

| | | | |
|---|---|---|---|
| 4,747,147 A | 5/1988 | Sparrow | |
| 5,465,303 A | 11/1995 | Levison et al. | |
| 5,631,972 A | 5/1997 | Ferris et al. | |
| 7,178,025 B2 | 2/2007 | Scheldt et al. | |
| 7,366,328 B2 | 4/2008 | Hamid et al. | |
| 8,055,277 B2 | 11/2011 | Park et al. | |
| 8,249,314 B2 | 8/2012 | Bolle et al. | |
| 8,824,746 B2 | 9/2014 | Abe | |
| 9,037,858 B1 | 5/2015 | Juels et al. | |
| 9,438,590 B2 | 9/2016 | Mandal et al. | |
| 9,736,122 B2 | 8/2017 | Dash | |
| 9,813,246 B2 | 11/2017 | Schwach et al. | |
| 9,858,402 B2 | 1/2018 | Shen et al. | |

(Continued)

FOREIGN PATENT DOCUMENTS

| | | |
|---|---|---|
| WO | 2018164630 A1 | 9/2018 |
| WO | 2019032113 A1 | 2/2019 |

(Continued)

*Primary Examiner* — Nicholas J Lee

(57) ABSTRACT

A device that includes a biometric device that is configured to capture a biometric signal for a user. The biometric signal is a signal that is linked to the user based on the physical characteristics of the user. The device further includes a memory operable to store a plurality of biometric signals. The device further includes a processor configured to obtain a user password from a user and obtain a first biometric signal for the user. The processor is further configured to identify a stored biometric signal from among the plurality of biometric signals in the memory that closest matches the first biometric signal. The processor is further configured to generate an authentication token by encrypting the user password with the stored biometric signal and to send the authentication token to an authentication device.

20 Claims, 3 Drawing Sheets

(56) References Cited

U.S. PATENT DOCUMENTS

| | | |
|---|---|---|
| 9,935,948 B2 | 4/2018 | Schultz et al. |
| 10,129,252 B1 | 11/2018 | Suen |
| 10,134,035 B1 | 11/2018 | Bent, II et al. |
| 10,405,034 B1 | 9/2019 | Nijim et al. |
| 10,460,207 B2 | 10/2019 | Matsunami |
| 10,469,259 B1 | 11/2019 | Fox et al. |
| 10,469,486 B2 | 11/2019 | Baras et al. |
| 10,484,178 B2 | 11/2019 | Andrade |
| 10,503,951 B2 | 12/2019 | Lee et al. |
| 10,530,576 B2 | 1/2020 | Lewis |
| 10,567,975 B2 | 2/2020 | Hoffberg |
| 10,659,217 B2 | 5/2020 | Ramasamy et al. |
| 10,673,847 B2 | 6/2020 | Lidsky |
| 10,742,410 B2 | 8/2020 | Gehrmann et al. |
| 10,749,681 B2 | 8/2020 | Andrade |
| 10,812,477 B2 | 10/2020 | Zou |
| 2004/0096086 A1 | 5/2004 | Miyasaka et al. |
| 2004/0175023 A1 | 9/2004 | Svedin et al. |
| 2006/0159316 A1 | 7/2006 | Chisamore et al. |
| 2008/0101662 A1 | 5/2008 | Lo et al. |
| 2010/0017618 A1 | 1/2010 | Golic et al. |
| 2010/0092048 A1 | 4/2010 | Pan et al. |
| 2014/0101453 A1* | 4/2014 | Senthurpandi .......... G06F 21/32 713/172 |
| 2015/0033301 A1 | 1/2015 | Pianese et al. |
| 2016/0036811 A1 | 2/2016 | Shim et al. |
| 2016/0300236 A1 | 10/2016 | Wiley et al. |
| 2020/0118130 A1 | 4/2020 | Brown |
| 2020/0143021 A1 | 5/2020 | Dawoud et al. |
| 2020/0252217 A1 | 8/2020 | Mathieu |
| 2020/0322155 A1 | 10/2020 | Cohen et al. |

FOREIGN PATENT DOCUMENTS

| | | | |
|---|---|---|---|
| WO | 2019059827 A1 | 3/2019 | |
| WO | 2019133339 A1 | 7/2019 | |
| WO | 2020073112 A1 | 4/2020 | |
| WO | 2020160101 A1 | 8/2020 | |

* cited by examiner

AUTHENTICATION USING ENCRYPTED BIOMETRIC INFORMATION

TECHNICAL FIELD

The present disclosure relates generally to information security, and more specifically to authentication using encrypted biometric information.

BACKGROUND

In a network environment, devices are in data communication with other devices that may be distributed anywhere in the world. These network environments allow data and information to be shared among devices. One of the technical challenges that occur when data is exchanged between devices is controlling data leakage, unauthorized access to data, and preventing malicious activities. Data storing devices, such as databases and servers, are vulnerable to online attacks. This vulnerability poses several network security challenges. For example, when a bad actor gains unauthorized access to a user's user password or biometric signal, the bad actor is able to perform malicious activities (e.g. data exfiltration or uploading malware) within a network while posing as the user.

SUMMARY

The system disclosed in the present application provides a technical solution to the technical problems discussed above by providing an authentication system that generates an authentication token for a user based on a user input and a biometric signal for the user. The disclosed system provides several practical applications and technical advantages which include a process for providing enhanced information security by using an encrypted combination of user inputs with a biometric signal to generate an authentication token. This process provides enhanced information security compared to using either a user password or a biometric signal alone. Using this process, a bad actor is unable to use a user's credentials or biometric signal without knowing which components are used to form an authentication token and how the components were combined and encrypted. This process prevents a bad actor from gaining unauthorized access to a user's account or network, which also prevents the bad actor from performing any malicious activities.

In one embodiment, the system comprises a biometric device that is configured to capture a biometric signal for a user. The biometric signal is a signal that is linked to the user based on the physical characteristics of the user. The system further includes a device that is configured to obtain a user password from a user and to obtain a first biometric signal for the user. The device is further configured to identify a stored biometric signal in memory that closest matches the first biometric signal. Any time the device obtains a biometric signal, there may be some variations in the biometric signal. To account for any variations in the obtained biometric signal, the device compares the first biometric signal to the biometric signals that are stored in memory and then identifies a biometric signal from memory that closest matches the biometric signal. The device will then use the identified biometric signal for the rest of the authentication process. This process allows the device to use known and consistent biometric signal for generating an authentication token. The device is further configured to generate an authentication token by encrypting the user password with the stored biometric signal and to send the authentication token to an authentication device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
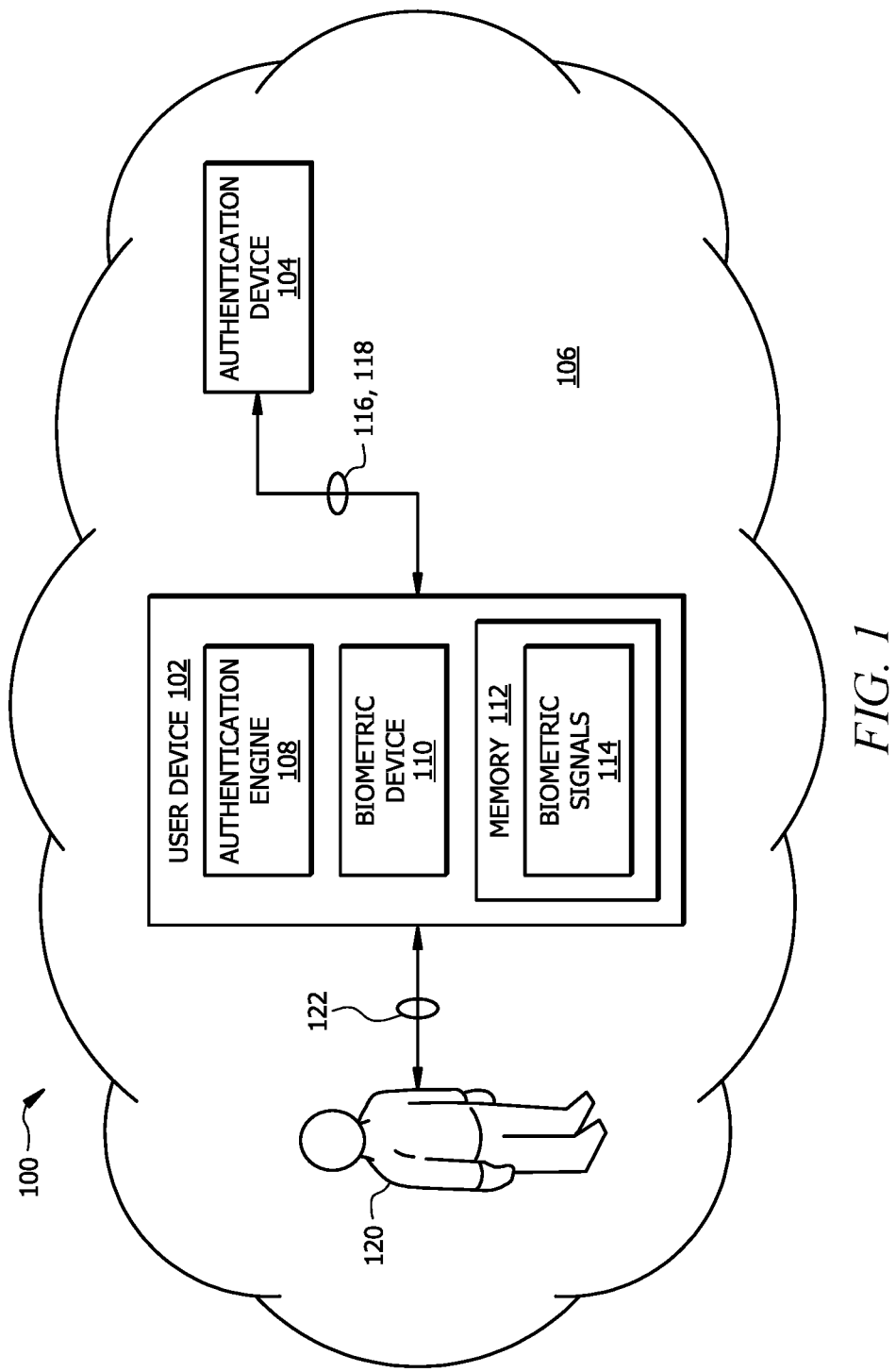
FIG. 1 is a schematic diagram of an embodiment of an authentication system that is configured to use encrypted biometric information.

FIG. 1 is a schematic diagram of an embodiment of an authentication system 100 that is configured to use encrypted biometric information. The authentication system 100 is generally configured to generate an authentication token 116 for a user 120 based on a user input 122 and a biometric signal 114 for the user 120. When a bad actor gains unauthorized access to a user's user password or biometric signal 114, the bad actor is able to perform malicious activities while posing as the user 120. The authentication system 100 provides enhanced information security by using an encrypted combination of user inputs 122 with a biometric signal 114 to generate an authentication token 116. This process provides enhanced information security compared to using just a user password or a biometric signal 114. In this case, a bad actor is unable to use a user's credentials or biometric signal 114 without knowing which components are used to form an authentication token 116 and how the components were encrypted and combined.

In one embodiment, the authentication system 100 comprises a user device 102 and an authentication device 104 that are in signal communication with each other over a network 106. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 106 may be configured to support any suitable type of communication protocol as would be appreciated by one of ordinary skill in the art.

Authentication Device

Examples of the authentication device 104 include, but are not limited to, a server, a database, a computer, or any other suitable type of device. The authentication device 104 is generally configured to authenticate a user 120 before allowing the user 120 to perform a restricted operation such as accessing information or performing a transaction. As an example, an authentication device 104 may be integrated with a database that is configured to store information. In this example, the authentication device 104 is configured to authenticate a user 120 before allowing the user 120 to access the information in the database. As another example, an authentication device 104 may be integrated with a cloud server that is configured to provide a service to a user 120. In this example, the authentication device 104 is configured to authenticate the user 120 before allowing the user 120 to access the service. As another example, the authentication device 104 may be configured to work cooperatively with a financial transaction device. In this example, the authentication device 104 is configured to authenticate a user 120 before allowing the user 120 to complete a financial transaction. In other examples, the authentication device 104 may be integrated with any other suitable type of device.

User Device

Examples of the user device 102 include, but are not limited to, a smartphone, a tablet, a smartwatch, a laptop, a computer, or any other suitable type of user device. The user device 102 is generally configured to generate an authentication token 116 for a user 120 based on a user input 122 and a biometric signal 114 for the user 120. Examples of user inputs 122 include, but are not limited to, a user password, a temporary token, a personal identification number (PIN) code, a device identifier, or any other suitable type of information. A biometric signal 114 is a signal (e.g. a bit string) that is uniquely linked to a user 120 based on the physical characteristics of the user 120.

An example of the user device 102 in operation is described below in FIG. 2. In one embodiment, the user device 102 comprises an authentication engine 108, one or more biometric devices 110, and a memory 112. The user device 102 may further comprise a graphical user interface, a display, a touch screen, buttons, knobs, or any other suitable combination of components. Additional details about the hardware configuration of the user device 102 are described in FIG. 3.

The memory 112 is configured to store biometric signals 114 and/or any other suitable type of data. A biometric signal 114 may be an analog or digital representation of a person's physical characteristics. For example, a biometric signal 114 may comprise a bit string that represents a person's physical characteristics. As another example, a biometric signal 114 may comprise an analog signal that represents a person's physical characteristics. In other examples, the biometric signal 114 may use any other suitable type of format to represent a person's physical characteristics.

In FIG. 1, a biometric device 110 is shown as being integrated with the user device 102. In some embodiments, a biometric device 110 may be an external device that is in signal communication with the user device 102. Examples of biometric devices 110 include, but are not limited to, retina scanners and fingerprint scanners. A biometric device 110 is a device that is configured to capture information about a person's physical characteristics and to output a biometric signal 114 based on captured information. As an example, a biometric device 110 may be configured to perform a retinal scan of the user's eye and to generate a biometric signal 114 for the user 120 based on the retinal scan. As another example, a biometric device 110 is configured to perform a fingerprint scan of the user's finger and to generate a biometric signal 114 for the user 120 based on the fingerprint scan. The authentication engine 108 uses biometric signals 110 to identify and/or authenticate a person.

The authentication engine 108 is generally configured to generate an authentication token 116 for a user 120 based on a user input 122 and a biometric signal 114 for the user 120. For example, the authentication engine 108 may be configured to encrypt a user password with a biometric signal 114 to generate an authentication token 116. This process provides enhanced information security compared to using just a user password or a biometric signal 114. For example, when a bad actor gains unauthorized access to a user's user password or biometric signal 114, the bad actor is able to perform malicious activities while posing as the user 120. The authentication engine 108 provides enhanced information security by using an encrypted combination of user inputs 122 with a biometric signal 114 to generate an authentication token 116. In this case, a bad actor is unable to use a user's credentials or biometric signal 114 without knowing which components are used to form an authentication token 116 and how the components were encrypted and combined. An example of the authentication engine 108 in operation is described in FIG. 2.

Authentication Process

Figure 2:
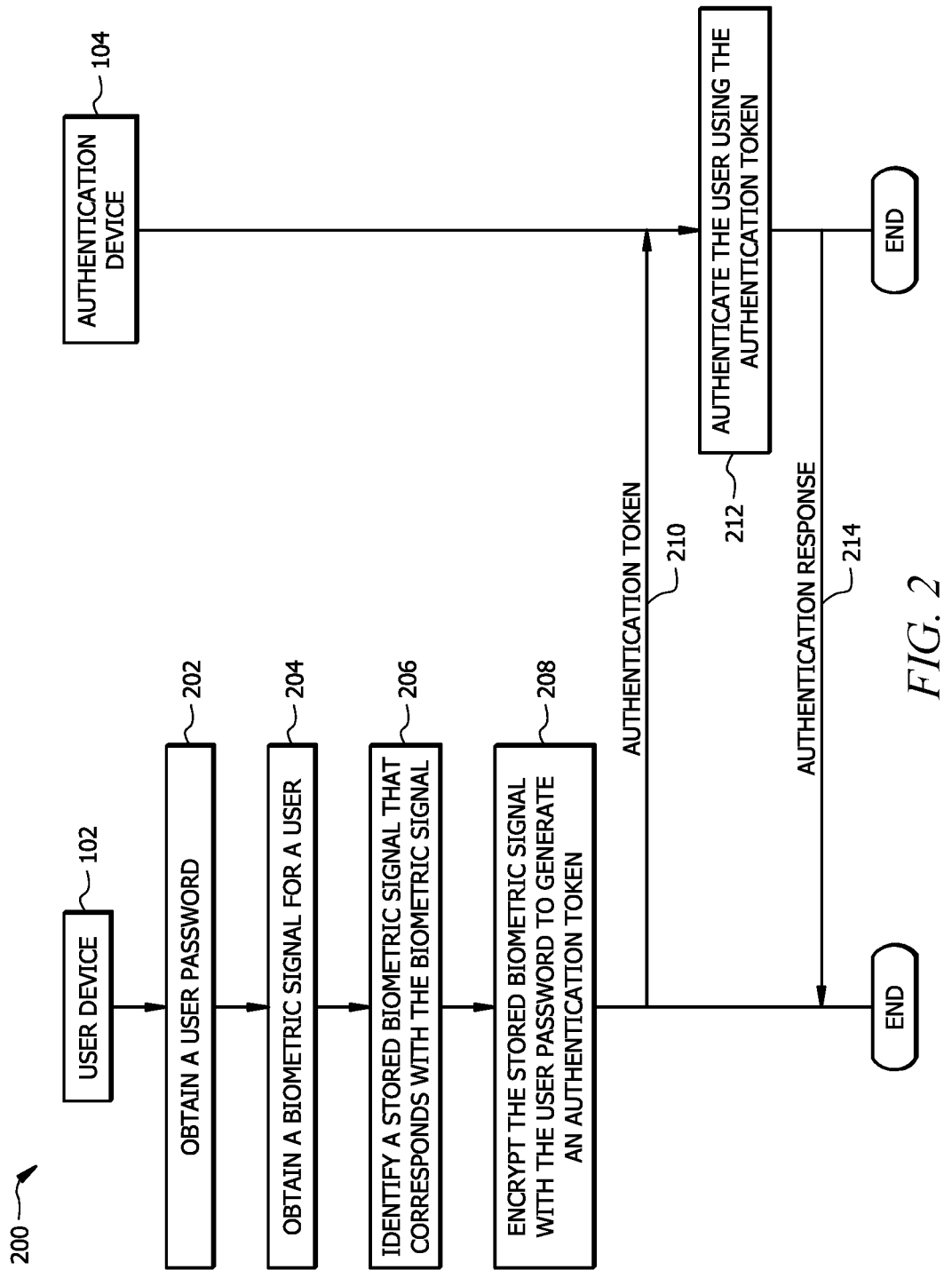
FIG. 2 is a flowchart of an embodiment of an authentication process using encrypted biometric information.

FIG. 2 is a flowchart of an embodiment of an authentication process 200 using encrypted biometric information. The authentication system 100 may employ process 200 to generate an authentication token 116 for a user 120 based on a user input 122 and a biometric signal 114 for the user 120. This process provides enhanced information security compared to using just a user password or a biometric signal 114 by itself. Process 200 provides enhanced information security by using an encrypted combination of user inputs 122 with a biometric signal 114 to generate an authentication token 116. Using this process, a bad actor is unable to use a user's credentials or biometric signal 114 without knowing which components are used to form an authentication token 116 and how the components were encrypted and combined.

At step 202, the user device 102 obtains a user password. The user device 102 may obtain the user password from a user using a graphical user interface (e.g. a touch screen or keypad) on the user device. In some embodiment, the user device 102 may also prompt the user 120 for a username, an email address, a phone number, an account number, an identification number, a PIN code, or any other suitable type of credentials.

In some embodiments, the user device 102 may also generate or request a temporary token that can be used for generating an authentication token 116. A temporary token may be a known randomly assigned value that can be used for generating an authentication token 116. The temporary token may only be valid for a predetermined amount of time. When the predetermined time period elapses, the temporary token is no longer usable and a new temporary token will need to be generated or requested.

At step 204, the user device 102 obtains a biometric signal 114 for the user. The user device 102 may obtain the biometric signal 114 for the user 120 using one or more biometric devices 110. As an example, the user device 102 may obtain the biometric signal 114 from a biometric device 110 that is configured to perform a retinal scan of the user's eye. In this example, the user device 102 obtains a biometric signal 114 for the user 120 that is based on the retinal scan. As another example, the user device 102 may obtain the biometric signal 114 from a biometric device 110 that is configured to perform a fingerprint scan of the user's finger. In this example, the user device 102 obtains a biometric signal 114 for the user 120 that is based on the fingerprint scan. In other examples, the user device 102 may employ any other suitable type of biometric device 110 to obtain a biometric signal 114 for the user 120.

At step 206, the user device 102 identifies a stored biometric signal 114 that corresponds with the obtained biometric signal 114 for the user 120. For example, the user device 102 may compare the obtained biometric signal 114 to the biometric signals 114 that are stored in memory 114 to identify a stored biometric signal 114 that closest matches the captured biometric signal 114. The user device 102 will then use the identified biometric signal 114 from memory 112 for generating the authentication token 116. Any time the user device 102 obtains a biometric signal 114, there may be some variations in the biometric signal 114. For example, the user's finger may be in slightly different positions each time the user 120 scans their finger on a fingerprint scanner. To account for any variations in the obtained biometric signal 114, the user device 102 compares the first biometric signal 114 to the biometric signals 114 that are stored in memory 112 and then identifies a biometric signal 114 from memory 112 that closest matches the biometric signal 114. The user device 102 will then use the identified biometric signal 114 for the rest of the authentication process. This process allows the user device 102 to use known and consistent biometric signal 114 for generating an authentication token 116.

At step 208, the user device 102 encrypts the stored biometric signal 144 with the user password to generate an authentication token 116. In one embodiment, the user device 102 generates the authentication token 116 by hashing at least a portion of the stored biometric signal 114 with the user password. As an example, the user device 102 may identify a predetermined portion of the stored biometric signal 114, extract the identified portion of the biometric signal 114, and hash the portion of the biometric signal 114 with the user password to generate the authentication token 116. As another example, the user device 102 may hash the entire biometric signal 114 with the user password to generate the authentication token 116.

In some embodiments, the user device 102 may first perform a hashing on the biometric signal 114 to reduce the size of the biometric signal 114 before hashing the biometric signal 114 with the user password. For example, the user device 102 may perform a first hashing operation on the biometric signal 114 to generate a hashed biometric signal 114. The user device 102 then performs a second hashing operation between the hashed biometric signal 114 and the user password to generate the authentication token 116.

In some embodiments, the user device 102 may encrypt the user password using the biometric signal 114. For example, the user device 102 may use the biometric signal 114 as an encryption key (e.g. a private key) for encrypting the user password. The user device 102 may employ any suitable type of encryption technique for encrypting the user password.

In some embodiments, generating the authentication token 116 may further comprise hashing other information with the biometric signal 114 and the user password. For example, the user device 102 may hash a PIN code, a username, an account number, an identifier, user credentials, a temporary token, a device identifier, or any other suitable type of information with the biometric signal 114 and the user passwords. As an example, the user device 102 may obtain a device identifier (e.g. a Media Access Control (MAC) address and/or an Internet Protocol (IP) address) for the user device 102 and hash the device identifier with the biometric signal 114 and the user passwords to generate the authentication token 116. As another example, the user device 102 may hash the biometric signal 114 and the user passwords with a temporary token that was obtained in step 202 to generate the authentication token 116.

At step 210, the user device 102 sends the authentication token 116 to the authentication device 104. After generating the authentication token 116, the user device 102 sends the authentication token 116 to the authentication device 104 to authenticate the identity of the user 120. The user device 102 may send the authentication token 116 by itself or as part of a request for a service. For example, the user device 102 may send the authentication token 116 as part of a request for information that is stored in a database. As another example, the user device 102 may send the authentication token 116 as part of a request for a service from a cloud server. As another example, the user device 102 may send the authentication token 116 as part of a request for a financial transaction. In other examples, the user device 102 may send the authentication token 116 as part of any other suitable type of request.

At step 212, the authentication device 104 authenticates the user 120 based on the authentication token 116. Here, the authentication device 104 may compare the authentication token 116 to a known authentication token 116 for the user 120. The authentication device 104 determines that the user 120 has passed authentication when the received authentication token 116 matches the known authentication token 116 for the user 120. Otherwise, the authentication device 104 determines that the user 120 has failed authentication when the received authentication token 116 does not match the known authentication token 116 for the user 120.

When the user 120 passes authentication, the authentication device 104 may then provide any requested information or service to the user device 102 for the user 120. For example, the authentication device 104 may provide access to information in a database after the user 120 passes authentication. As another example, the authentication device 104 may provide a service to the user 120 after the user 120 passes authentication. As another example, the authentication device 104 may process a financial transaction for the user 120 after the user 120 passes authentication. In other examples, the authentication device 104 may provide any other suitable type of information or service to the user 120 after the user 120 passes authentication.

At step 214, the authentication device 104 sends an authentication response 118 to the user device 102. The authentication response 118 indicates whether the user 120 has passed or failed authentication based on the authentication token 116. For example, the authentication response 118 may be a text message, an email, or pop-up notification that indicates whether the user 120 has passed or failed authentication. In other examples, the authentication response 118 may use any other suitable technique to indicate whether the user 120 has passed or failed authentication.

Hardware Configuration for an Authentication Device

Figure 3:
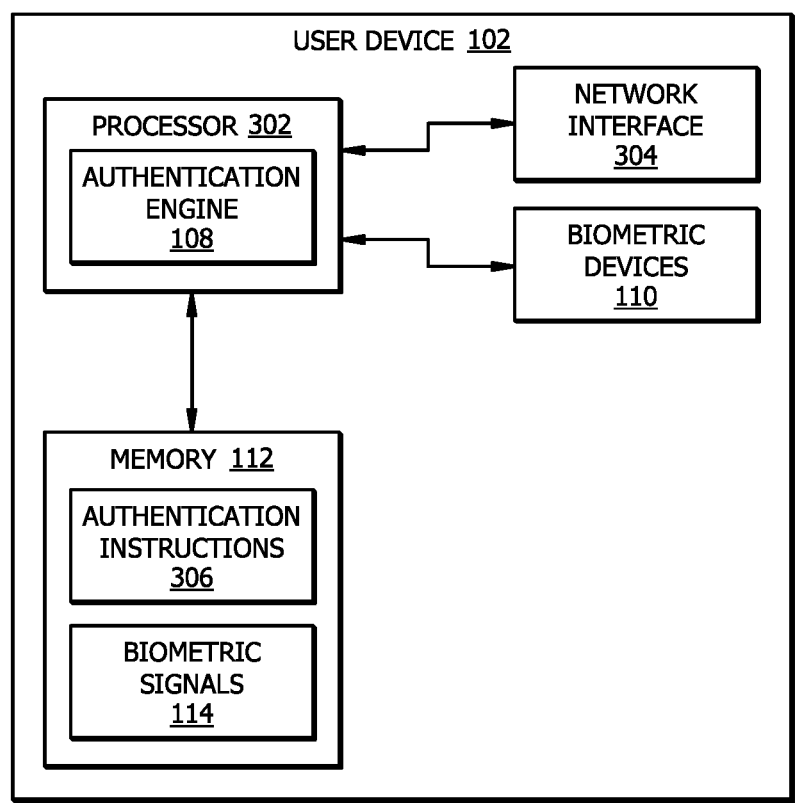
FIG. 3 is an embodiment of a device configured to use encrypted biometric information for authentication.

FIG. 3 is an embodiment of a device (e.g. user device 102) of an authentication system 100. As an example, the user device 102 comprises a processor 302, a memory 112, one or more biometric devices 110, and a network interface 304. The user device 102 may be configured as shown or in any other suitable configuration.

Processor

The processor 302 comprises one or more processors operably coupled to the memory 112. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 112, the biometric devices 110, and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute authentication instructions 306 to implement the authentication engine 108. In this way, processor 302 may be a special-purpose computer designed to implement the functions disclosed herein. In an embodiment, the authentication engine 108 is implemented using logic units, FPGAs, ASICs, DSPs, or any other suitable hardware. The authentication engine 108 is configured to operate as described in FIGS. 1 and 2. For example, the authentication engine 108 may be configured to perform the steps of process 200 as described in FIG. 2.

Memory

The memory 112 is operable to store any of the information described above with respect to FIGS. 1 and 2 along with any other data, instructions, logic, rules, or code operable to implement the function(s) described herein when executed by the processor 302. The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store authentication instructions 306, biometric signals 114, and/or any other data or instructions. The authentication instructions 306 may comprise any suitable set of instructions, logic, rules, or code operable to execute the authentication engine 108. The biometric signals 114 are configured similar to the biometric signals 114 described in FIGS. 1-2.

Biometric Devices

Examples of biometric devices 110 include, but are not limited to, retina scanners and fingerprint scanners. Biometric devices 110 may be configured similar to the biometric devices 110 that are described in FIG. 1. For example, a biometric device 110 may be configured to capture information about a person's physical characteristics and to output a biometric signal 114 based on captured information. The biometric signal 114 is a signal that is uniquely linked to a person based on their physical characteristics. As an example, a biometric device 110 may be configured to perform a retinal scan of the user's eye and to generate a biometric signal 114 for the user 120 based on the retinal scan. As another example, a biometric device 110 is configured to perform a fingerprint scan of the user's finger and to generate a biometric signal 114 for the user 120 based on the fingerprint scan. The biometric signal 110 is used by the authentication engine 108 as part of the authentication process 200 to identify and authenticate a user 120.

Network Interface

The network interface 304 is configured to enable wired and/or wireless communications. The network interface 304 is configured to communicate data between the user device 102 and other devices (e.g. authentication device 104), systems, or domains. For example, the network interface 304 may comprise an NFC interface, a Bluetooth interface, a Zigbee interface, a Z-wave interface, an RFID interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A device, comprising:
    a biometric device configured to capture a biometric signal for a user, wherein the biometric signal is a signal that is linked to the user based on physical characteristics of the user;
    a memory operable to store a plurality of biometric signals; and
    a processor operably coupled to the biometric device and the memory, configured to:
        obtain a user password from a user;
        obtain a first biometric signal for the user;
        identify a stored biometric signal from among the plurality of biometric signals in the memory that closest matches the first biometric signal;
        generate an authentication token by encrypting the user password with the stored biometric signal; and
        send the authentication token to an authentication device.

2. The device of claim 1, wherein generating the authentication token comprises hashing at least a portion of the stored biometric signal with the user password.

3. The device of claim 1, wherein generating the authentication token comprises:
performing a first hashing operation on the stored biometric signal to generate a hashed biometric signal, wherein performing the first hashing reduces a size of the stored biometric signal; and
performing a second hashing operation between the hashed biometric signal and the user password.

4. The device of claim 1, wherein:
the processor is further configured to obtain a device identifier for a user device that is associated with the user; and
generating the authentication token further comprises hashing the device identifier with the stored biometric signal and the user password.

5. The device of claim 1, wherein:
the processor is further configured to:
send a request for a temporary token;
obtain the temporary token in response to sending the request; and
generating the authentication token further comprises hashing the temporary token with the stored biometric signal and the user password.

6. The device of claim 1, wherein generating the authentication token comprises using at least a portion of the stored biometric signal as an encryption key for encrypting the user password.

7. The device of claim 1, wherein obtaining the first biometric signal for the user comprises scanning a fingerprint of the user.

8. An authentication method, comprising:
obtaining a user password from a user;
obtaining a first biometric signal for the user from a biometric device, wherein:
the biometric device configured to capture the first biometric signal for a user; and
the first biometric signal is a signal that is linked to the user based on physical characteristics of the user;
identifying a stored biometric signal from among a plurality of biometric signals in a memory that closest matches the first biometric signal;
generating an authentication token by encrypting the user password with the stored biometric signal; and
sending the authentication token to an authentication device.

9. The method of claim 8, wherein generating the authentication token comprises hashing at least a portion of the stored biometric signal with the user password.

10. The method of claim 8, wherein generating the authentication token comprises:
performing a first hashing operation on the stored biometric signal to generate a hashed biometric signal, wherein performing the first hashing reduces a size of the stored biometric signal; and
performing a second hashing operation between the hashed biometric signal and the user password.

11. The method of claim 8, further comprising obtaining a device identifier for a user device that is associated with the user; and
wherein generating the authentication token further comprises hashing the device identifier with the stored biometric signal and the user password.

12. The method of claim 8, further comprising:
sending a request for a temporary token; and
obtaining the temporary token in response to sending the request; and
wherein generating the authentication token further comprises hashing the temporary token with the stored biometric signal and the user password.

13. The method of claim 8, wherein generating the authentication token comprises using at least a portion of the stored biometric signal as an encryption key for encrypting the user password.

14. The method of claim 8, wherein obtaining the first biometric signal for the user comprises scanning a fingerprint of the user.

15. A computer program comprising executable instructions stored in a non-transitory computer-readable medium that when executed by a processor causes the processor to:
obtain a user password from a user;
obtain a first biometric signal for the user from a biometric device, wherein:
the biometric device configured to capture the first biometric signal for a user; and
the first biometric signal is a signal that is linked to the user based on physical characteristics of the user;
identify a stored biometric signal from among a plurality of biometric signals in a memory that closest matches the first biometric signal;
generate an authentication token by encrypting the user password with the stored biometric signal; and
send the authentication token to an authentication device.

16. The computer program of claim 15, wherein generating the authentication token comprises hashing at least a portion of the stored biometric signal with the user password.

17. The computer program of claim 15, wherein generating the authentication token comprises:
performing a first hashing operation on the stored biometric signal to generate a hashed biometric signal, wherein performing the first hashing reduces a size of the stored biometric signal; and
performing a second hashing operation between the hashed biometric signal and the user password.

18. The computer program of claim 15, further comprising instructions that when executed by the processor causes the processor to obtain a device identifier for a user device that is associated with the user; and
wherein generating the authentication token further comprises hashing the device identifier with the stored biometric signal and the user password.

19. The computer program of claim 15, further comprising instructions that when executed by the processor causes the processor to:
send a request for a temporary token; and
obtain the temporary token in response to sending the request; and
wherein generating the authentication token further comprises hashing the temporary token with the stored biometric signal and the user password.

20. The computer program of claim 15, wherein generating the authentication token comprises using at least a portion of the stored biometric signal as an encryption key for encrypting the user password.

* * * * *